US012577930B1

(12) United States Patent
Pillai et al.

(10) Patent No.: US 12,577,930 B1
(45) Date of Patent: Mar. 17, 2026

(54) ENGINE REVERSE ROTATION AND CONTROL

(71) Applicant: Robert Bosch GmbH, Stuttgart (DE)

(72) Inventors: Bijith T G Pillai, Farmington Hills, MI (US); Abhilash Puthuparambil Krishnadas, Bangalore (IN)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/932,200

(22) Filed: Oct. 30, 2024

(51) Int. Cl.
*G06F 19/00* (2018.01)
*F02P 5/15* (2006.01)

(52) U.S. Cl.
CPC .................................... *F02P 5/15* (2013.01)

(58) Field of Classification Search
CPC ............ F02D 41/009; F02D 2200/101; F02D 2250/06; F02D 41/0097; F02N 2250/04; F02P 11/02
USPC ........................................................ 701/102
See application file for complete search history.

(56) References Cited

U.S. PATENT DOCUMENTS 6,435,158 B1 8/2002 Mingo et al.
7,931,014 B2 * 4/2011 Masaoka ................. F02P 11/02 123/631
8,091,411 B2 1/2012 Fulks
11,566,571 B2 * 1/2023 Eloy .................. F02D 41/0097
11,959,820 B2 * 4/2024 Kelly ...................... G01M 1/32
2014/0060486 A1 3/2014 Maezawa
2015/0369166 A1 * 12/2015 Kurata ............... F02D 41/1444 123/435
2019/0226440 A1 * 7/2019 Murakami ............... H02P 9/48
2023/0287840 A1 * 9/2023 Schreurs ............ F02D 41/1497

* cited by examiner

*Primary Examiner* — Hung Q Nguyen
*Assistant Examiner* — James J Kim

(74) *Attorney, Agent, or Firm* — Michael Best & Friedrich LLP

(57) ABSTRACT

An apparatus and method for operating an engine. The apparatus includes a crankshaft trigger wheel coupled to a crankshaft and a set of sensors equipped to generate a crankshaft signal associated with an instantaneous speed of the crankshaft trigger wheel. A controller is configured to receive the crankshaft signal corresponding to the instantaneous speed, determine a minimum instantaneous speed for the crankshaft trigger wheel to overcome a top dead center (TDC), and predict a reverse rotation event for the engine when the instantaneous speed falls below the minimum instantaneous speed. After making the prediction, ignition of the engine is prevented prior to the reverse rotation event occurring.

20 Claims, 6 Drawing Sheets

ENGINE REVERSE ROTATION AND CONTROL

FIELD

Among other things, a control system and method for operating an engine in a reverse rotation event are described herein.

SUMMARY

In general, engines rotate in a specific direction, which is often referred to as a forward direction. However, an engine can rotate in a reverse direction under a few operating scenarios. Once the engine rotates in reverse, if the reverse rotation is not detected, the correct control of injection of fuel and ignition of the fuel by the engine controller is disrupted, causing the engine to continue to rotate in reverse for a certain time. Combustion of fuel during this time can lead to engine damage. To help prevent ignition of the fuel and subsequent combustion during a reverse rotation event, the engine controller must be able to predict the change of direction in advance, so the charging of the ignition coil is not initiated, and further injection and ignition events are prohibited. Current engine controllers (often referred to as or contained within engine control units (ECU)) detect reverse rotation only after the change of direction of rotation, which can be too late. The starter idle gear, intake manifold, and the like may be damaged in a reverse rotation event.

In some aspects, the techniques described herein relate to a control system for an engine. The control system includes a crankshaft trigger wheel coupled to a crankshaft. The control system includes a set of sensors equipped to generate a crankshaft signal associated with an instantaneous speed of the crankshaft trigger wheel. The control system includes a controller configured to: receive the crankshaft signal corresponding to the instantaneous speed; determine a minimum instantaneous speed for the crankshaft trigger wheel to overcome a top dead center (TDC); predict a reverse rotation event for the engine when the instantaneous speed falls below the minimum instantaneous speed; and cease ignition for the engine prior to the reverse rotation event occurring.

In some aspects, the techniques described herein relate to a control system, wherein the crankshaft trigger wheel includes individual teeth and tooth spaces, and the crankshaft signal is associated with movement of each individual tooth of the crankshaft trigger wheel.

In some aspects, the techniques described herein relate to a control system, wherein the controller includes an electronic processor.

In some aspects, the techniques described herein relate to a control system, wherein the controller includes software executed by the electronic processor.

In some aspects, the techniques described herein relate to a control system, wherein the controller is configured to: determine an average speed of the crankshaft trigger wheel based on a number of crankshaft signals received, and determine a deceleration value as the crankshaft trigger wheel approaches top dead center (TDC) by taking a difference between the instantaneous speed and the average speed.

In some aspects, the techniques described herein relate to a control system, wherein the controller is configured to: determine a maximum deceleration value, compare the deceleration value to the maximum deceleration value, and predict the reverse rotation event when the deceleration value exceeds the maximum deceleration value.

In some aspects, the techniques described herein relate to a control system, wherein the controller is configured to set a first rotation event flag when the instantaneous speed falls below the minimum instantaneous speed and to set a second rotation event flag when the deceleration value exceeds the maximum deceleration value.

In some aspects, the techniques described herein relate to a control system, wherein the controller is configured to cease ignition for the engine after both the first rotation event flag and the second rotation event flag have been set.

In some aspects, the techniques described herein relate to a control system, wherein the set of sensors is located at a predetermined angular position.

In some aspects, the techniques described herein relate to a control system, wherein the engine is a multi-cylinder engine.

In some aspects, the techniques described herein relate to a method for operating an engine. The method includes receiving, at an electronic processor, a crankshaft signal corresponding to an instantaneous speed associated with a rotation of a crankshaft of the engine; determining, via the electronic processor, a minimum instantaneous speed for the engine to overcome a top dead center (TDC); predicting, via the electronic processor, a reverse rotation event for the engine when the instantaneous speed falls below the minimum instantaneous speed; and ceasing, via the electronic processor, ignition for the engine prior to the reverse rotation event occurring.

In some aspects, the techniques described herein relate to a method, wherein the crankshaft signal is associated with each individual tooth of a crankshaft trigger wheel mounted to the crankshaft.

In some aspects, the techniques described herein relate to a method, further including determining, via the electronic processor, an average speed of the crankshaft trigger wheel based on a number of crankshaft signals received.

In some aspects, the techniques described herein relate to a method, further including determining, via the electronic processor, a deceleration value as the crankshaft trigger wheel approaches top dead center (TDC) by taking a difference between the instantaneous speed and the average speed.

In some aspects, the techniques described herein relate to a method, further including determining, via the electronic processor, a maximum deceleration value and comparing the deceleration value to the maximum deceleration value.

In some aspects, the techniques described herein relate to a method, further including predicting the reverse rotation event when the deceleration value exceeds the maximum deceleration value.

In some aspects, the techniques described herein relate to a method, further including setting a first rotation event flag when the instantaneous speed falls below the minimum instantaneous speed and setting a second rotation event flag when the deceleration value exceeds the maximum deceleration value.

In some aspects, the techniques described herein relate to a method, wherein ceasing ignition for the engine occurs after both the first rotation event flag and the second rotation event flag have been set.

In some aspects, the techniques described herein relate to a method, further including sensing, with a set of sensors located at a predetermined angular position, the crankshaft signal.

In some aspects, the techniques described herein relate to a method, further including setting a reverse rotation event flag when the instantaneous speed falls below the minimum instantaneous speed.

Other aspects, features, examples, and embodiments will become apparent by consideration of the detailed description and accompanying drawings.

DETAILED DESCRIPTION

Determining the crankshaft angle for controlling internal combustion engines enables determination of an instantaneous speed for a crankshaft trigger wheel and, in turn, a crankshaft of the engine. Utilizing this data, an average speed of the engine can also be determined. Conventionally, data collected with sensors has enabled a determination of a reverse rotation event. However, determining that a reverse rotation event is occurring happens after the engine has already begun to reverse. This is too late for preventing unwanted effects on engine parts such as the starter idle gear and the intake manifold.

Methods involving additional sensors on the crankshaft or camshaft are costly and require substantial modifications of the engine design. Methods described herein are, among other things, adapted to the engine using careful plausibility analysis that take into account different operating conditions to provide reliable results. In some examples described herein, the method improves reverse rotation detection by implementing an early prediction algorithm.

Among other things, an apparatus and method for operating an engine by predicting a reverse rotation event and preventing further ignition of the engine is described herein. In some instances, a controller utilizes both the average speed and/or the instantaneous speed, in an algorithm for predicting a reverse rotation event and then preventing the charging of an ignition coil and any further injection and ignition events. In some instances, the algorithm includes two checks, an instantaneous check and a deceleration check.

For engines, including multiple cylinder engines, predicting a reverse rotation event provides protection for parts of the engine and prevents unnecessary wear on the crankshaft. By predicting a reverse rotation with multiple checks false predictions are prevented.

Figure 1:
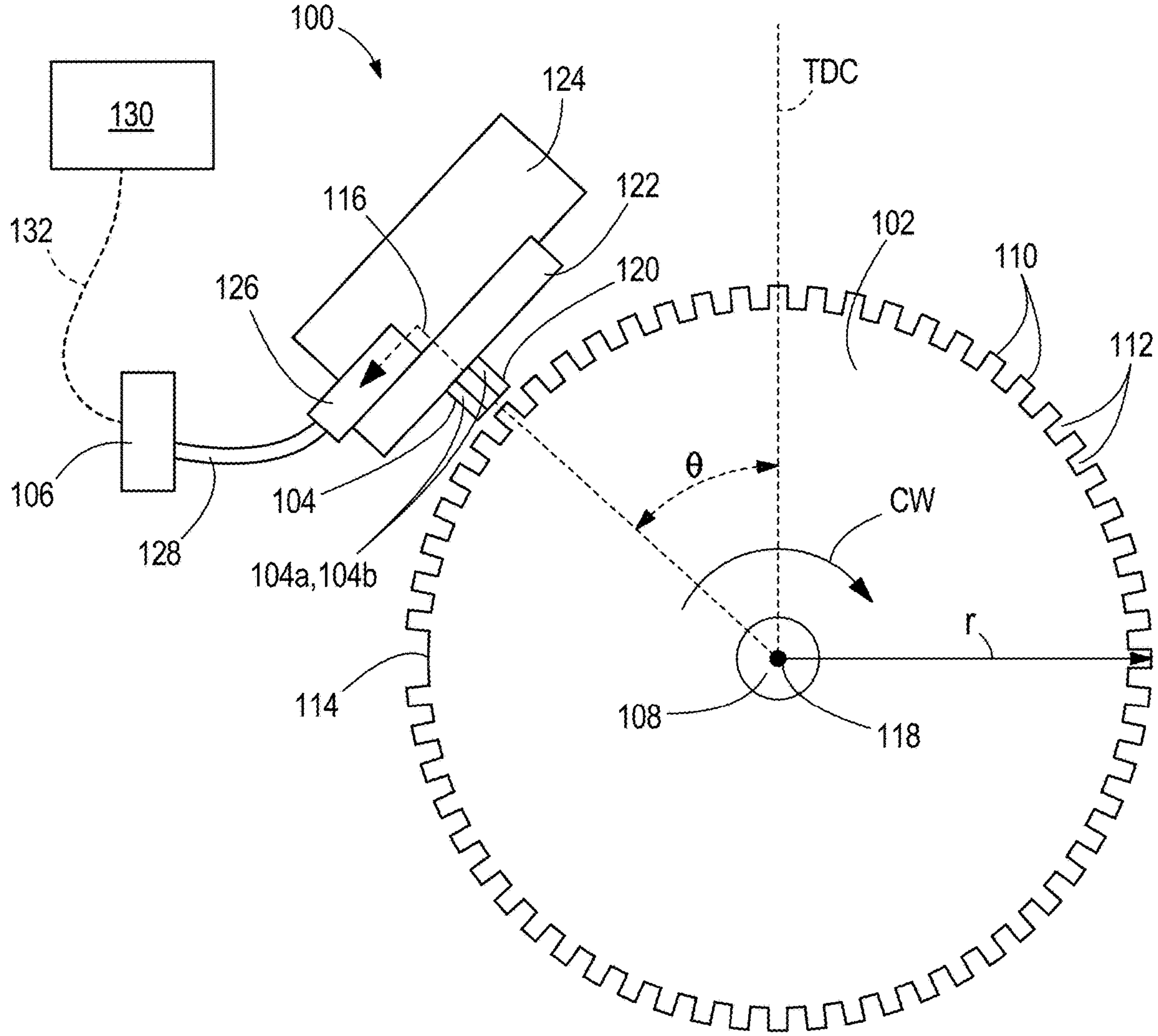
FIG. 1 illustrates a control system for an engine according to an aspect of the disclosure is mounted.
Figure 2:
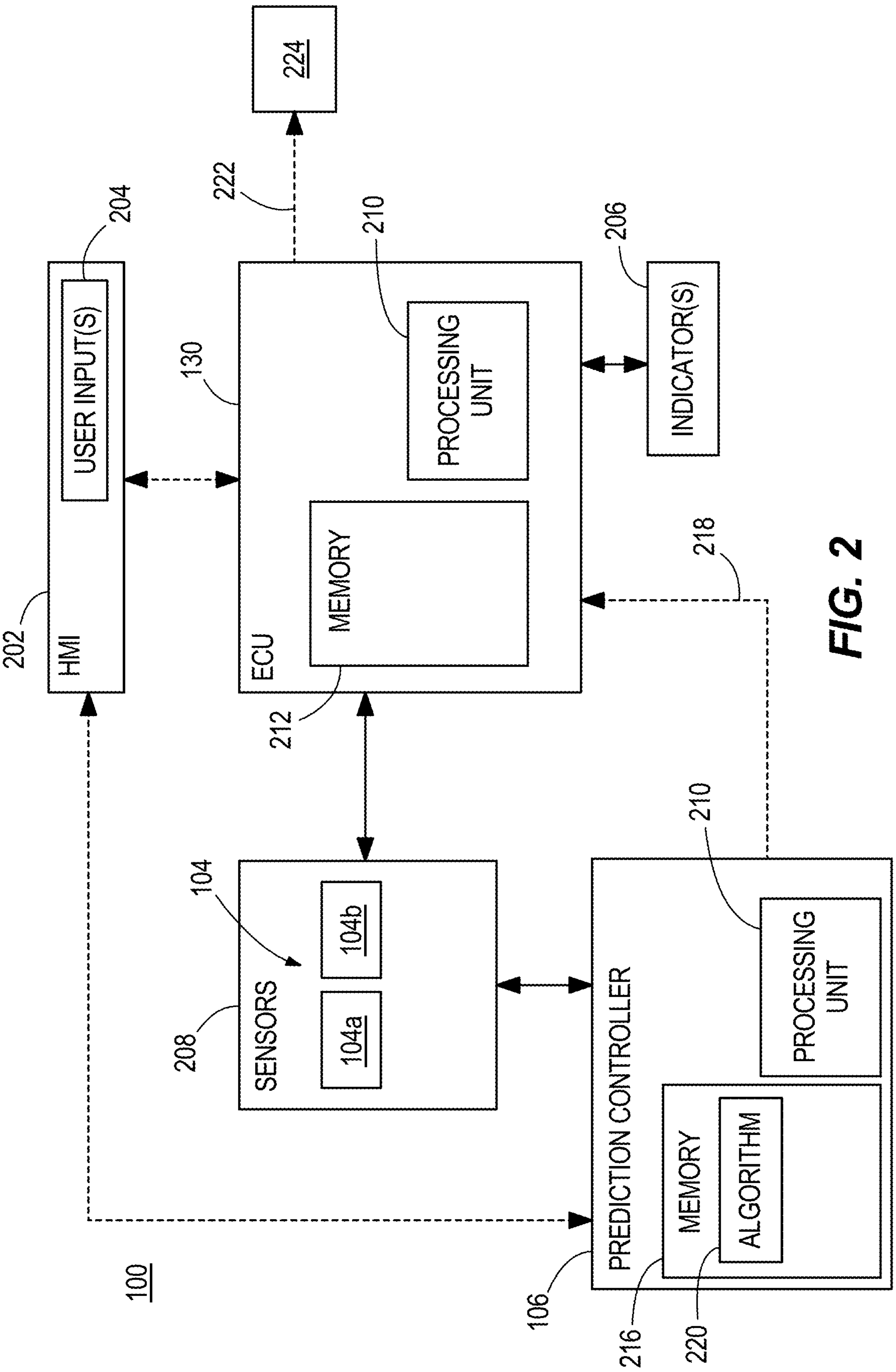
FIG. 2 is a schematic of the control system from FIG. 1 according to some aspects of the disclosure herein.

FIG. 1 illustrates a control system 100 for an engine 224 (FIG. 2). In the example shown, the control system 100 includes a crankshaft trigger wheel 102, a set of sensors 104, and a prediction controller 106. The crankshaft trigger wheel 102 has a radius (r) and is coupled to a crankshaft 108 that rotates about a crankshaft axis 118 to provide power to the engine. The crankshaft trigger wheel 102 may include an alternating arrangement of teeth 110 and tooth spaces 112, with a missing tooth section 114. While illustrated as a 60-2 crankshaft trigger wheel 102, any arrangement of teeth 110 and tooth spaces 112 is contemplated, including irregular spacing.

In some instances, the set of sensors 104 is arranged proximate the crankshaft trigger wheel 102 and oriented to face the crankshaft trigger wheel 102. In the example shown, the set of sensors 104 are oriented at a predetermined angular position (0) with respect to a top dead center (TDC) of the crankshaft trigger wheel 102. The set of sensors 104 is equipped to generate a signal 116 corresponding to movement of the teeth 110 and tooth spaces 112 as the crankshaft trigger wheel 102 rotates about the crankshaft axis 118 in a clockwise direction (CW). The set of sensors 104 may include a hall effect sensor or an inductive sensor. The set of sensors 104 may be two sensors 104*a*, 104*b* located within a housing 120, each sensor configured to generate a corresponding signal. The set of sensors 104 may be mounted to a mounting flange 122 which is mounted to an engine block 124.

The prediction controller 106 may be connected to a control interface 126 via a wiring harness 128. The control interface 126 may connect the set of sensors 104 to the wiring harness 128. The control interface 126 may include one or more input mechanisms and one or more output mechanisms (for example, general-purpose input/outputs (GPIOs), a controller area network bus (CAN) bus interface, analog inputs digital inputs, and the like).

An engine control unit (ECU) 130 may be mounted elsewhere in the engine and/or a housing (e.g., a vehicle) of the engine. An electrical connection between the ECU 130 and the prediction controller 106 may be wired. In other instances, a wireless connection 132 is utilized either partially or for the entire electrical connection between the ECU and the prediction controller 106.

The prediction controller 106 and/or the ECU 130 may be provided as a single unit or may be divided into plural units. In addition, the prediction controller 106 and/or the ECU 130 may partially or entirely be constructed of a microcomputer, a microprocessor unit, or the like. The prediction controller 106 and/or the ECU 130 may include software, for example, firmware that can be updated. The software or firmware is executed by the microcomputer, microprocessor unit, or other electronic processor within or that is part of the prediction controller 106 and/or the ECU 130.

FIG. 2 is a schematic of the control system 100. In the example shown, the control system 100 includes the prediction controller 106 and the ECU 130. In some aspects, the control system 100 includes a human machine interface (HMI) 202. The HMI 202 receives input from, and provides output to, users of the control system 100 via user input(s) 204. The HMI 202 may include a keypad, switches, buttons, soft keys, indictor lights, haptic vibrators, a display (e.g., a touchscreen), or some combination thereof. In some aspects, the prediction controller 106 and/or the ECU 130 is user configurable via the HMI 202.

The ECU 130 is configured to be connected to various components. In one example, when installed, the ECU 130 is electrically connected to a variety of components of the engine. In one instance, the ECU 130 is connected to one or more user inputs 204, one or more indicators 206, and one or more sensors 208, including the set of sensors 104. As previously noted, the connection between the ECU 130 and the control interface may be wireless or wired. In one aspect, the ECU 130 receives wireless inputs from an application running on an external device (e.g., a smartphone, a tablet, a laptop computer, or the like). The ECU 130 may include, among other things, a main electronic processor 210 (e.g., a microprocessor, a microcontroller, or another suitable programmable device) and a memory 212 (which is sometimes referred to as a main memory 212 to distinguish the memory 212 from other memory components).

Similar to the ECU 130, the prediction controller 106 is also configured to be connected to various components. In one example, when installed, the prediction controller 106 is a dedicated controller for the control system 100. In one instance, the prediction controller 106 is electrically connected to the set of sensors 104. A prediction electronic processor 214 (e.g., a microprocessor, a microcontroller, or another suitable programmable device) and a memory 216 (sometime referred to as prediction memory 216 to distinguish it from other memory components) are possible components of the prediction controller 106. In one example, the prediction controller 106 is configured to predict and send a reverse rotation event flag 218 to the ECU 130 and the ECU 130 is configured to send a cease ignition signal 222 to the engine 224. In some examples, the engine is a multi-cylinder engine.

In some examples, the main electronic processor 210 and/or the prediction electronic processor 214, simply referred to herein as electronic processors 210, 214, are implemented as a microprocessor with separate memory, for example the main memory 212 and/or the prediction memory 216. In other examples, the electronic processors 210, 214, may be implemented as a microcontroller (with main memory 212 and/or prediction memory 216 on the same chip). In other examples, the electronic processors 210, 214, may be implemented using multiple processors. In addition, the electronic processors 210, 214, may be implemented partially or entirely as, for example, a field-programmable gate array (FPGA), an applications specific integrated circuit (ASIC), and the like and the main memory 212 and/or prediction memory 216 may not be needed or be modified accordingly.

In some examples, the main memory 212 and/or the prediction memory 216, referred to herein as memories 212, 216, include non-transitory, computer-readable memory that stores instructions that are received and executed by the corresponding electronic processors 210, 214 to carry out method described herein including methods of road surface prediction. The memory memories 212, 216 may include, for example, a program storage area and a data storage area. The program storage area and the data storage area may include combinations of different types of memory, for example read-only memory and random-access memory.

In some aspects, software is stored within the memories 212, 216. For instance, a reverse rotation event algorithm 220, referred to herein as algorithm 220, is stored within the prediction memory 216 or in a separate memory location, e.g., the main memory 212. In some examples, software, logic, and processing may be distributed. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Figure 3:
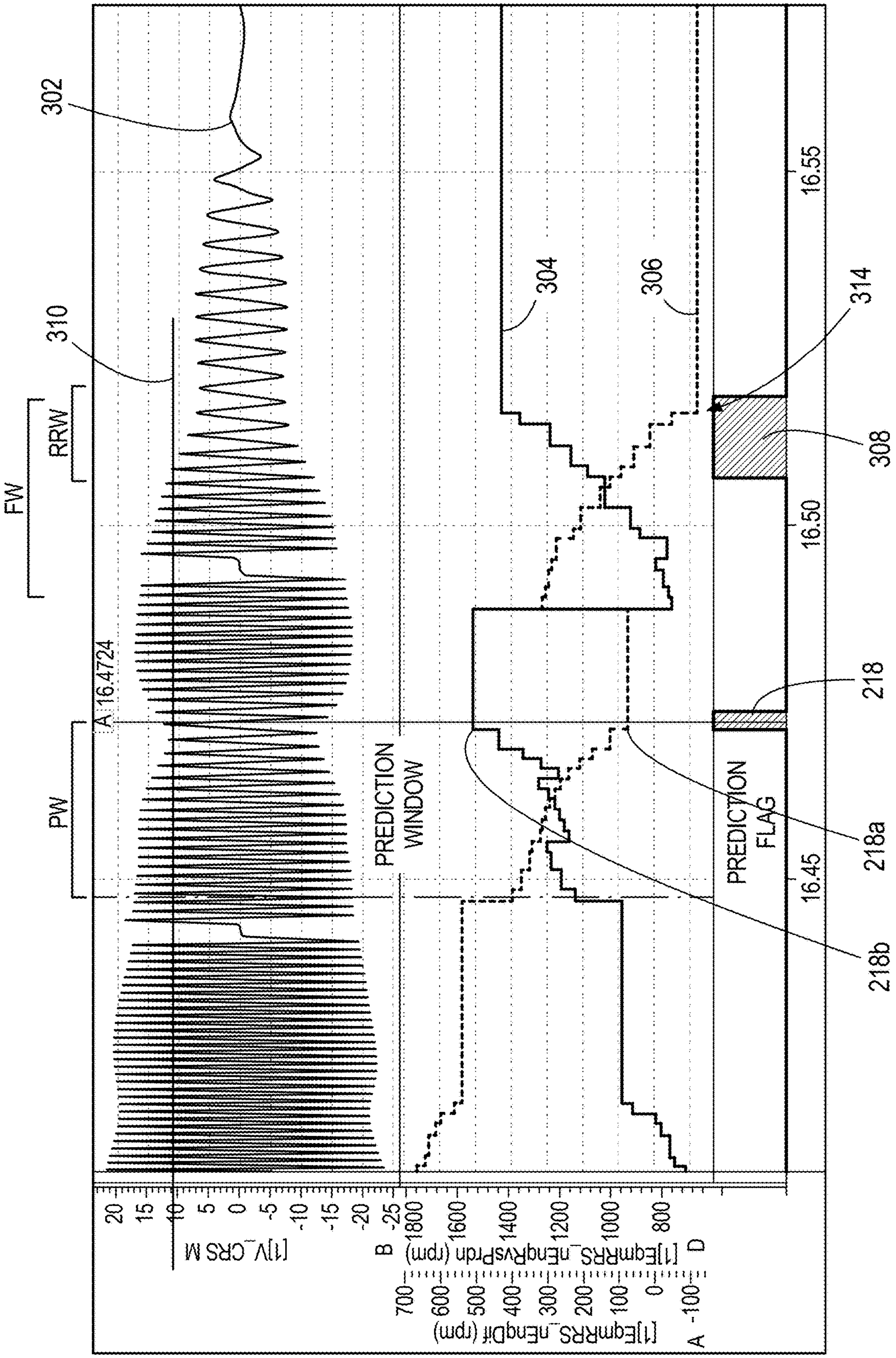
FIG. 3 is an example detection graph for an engine during operation according to some aspects of the disclosure herein.

Turning to FIG. 3, an example detection graph 300 for an engine during operation is illustrated. The graph includes a crankshaft signal 302, a deceleration signal 304, and an instantaneous speed signal 306. Each signal 302, 304, 306 may be detected by and/or derived from the set of sensors 104. In one example, when the crankshaft 108 rotates, a magnetic field of the set of sensors 104 changes, creating voltage pulses which are illustrated as the crankshaft signal 302. The prediction controller 106 and/or the ECU 130 derives position information from the crankshaft signal 302 to define a deceleration signal 304 and an instantaneous speed signal 306 associated with the crankshaft 108/crankshaft trigger wheel 102. This information is then used to determine when to operate the fuel injectors and generate a spark utilizing, by way of example, an ignition coil.

For the example illustrated, a reverse rotation event 308 occurs during a reverse rotation window RRW. The reverse rotation window is defined based on a range of crank shaft angles related to TDC. For example, the length of the window may be 180 degrees and the reverse event occurs at 90 degrees before TDC. Individual windows are defined for each cylinder in the engine. It can be seen that the crankshaft signal 302 falls below a 10 volt (10V) voltage magnitude 310 without recovering during the reverse rotation window RRW. The algorithm 220 described herein is developed based on the deceleration signal 304 and the instantaneous speed signal 306 during this reverse rotation window RRW.

To prevent the reverse rotation event 308, and in turn charging of the ignition coil, the reverse rotation event flag 218 is set during a prediction window PW which happens prior to reverse rotation window RRW. Over the course of the prediction window TP, it can be seen that the deceleration signal 304 is generally increasing and the instantaneous speed signal 304 is generally decreasing until they overlap when the deceleration speed signal 304 is equal to 300 RPM and the instantaneous speed signal 306 is equal to 1240 RPM.

In developing the reverse rotation event algorithm 220, it was discovered that this overlap is still within a range where the crankshaft 108 can continue to rotate in the clockwise, or forward, direction. Closely thereafter, when the deceleration signal 304 is 500 RPM and the instantaneous speed signal 306 is 960 RPM, the crankshaft trigger wheel 102 is only just able to rotate from the predetermined angular position θ to the TDC. In other words, during a final window FW, the crankshaft 108 rotates to a point where an instantaneous speed at TDC is equal to zero, see arrow 314. Therefore, the algorithm is developed to allow a final rotation, while preventing the reverse rotation event 308. For this example, a maximum deceleration threshold ($d_{max}$) of 300 RPM and a minimum instantaneous speed threshold ($Si_{min}$) of 900 RPM are derived. The maximum deceleration threshold ($d_{max}$) and the minimum instantaneous speed threshold ($Si_{min}$) are predetermined based on the engine 224. When both of the $d_{max}$ and $Si_{min}$ thresholds are crossed, the reverse rotation event flag 218 is set, as any values beyond produce an undesired reverse rotation event 308, and a signal is sent to cease an upcoming charging of the ignition coil to prevent combustion of fuel in the engine.

In one example when the minimum instantaneous threshold $Si_{min}$ is crossed a first reverse rotation event flag **218*a* is set and when the maximum deceleration value threshold $d_{max}$ is crossed a second reverse rotation event flag 218*b*. After both flags 218*a*, 218*b*** have been set a signal is sent to cease an upcoming charging of the ignition coil to prevent combustion in the engine.

Figure 4:
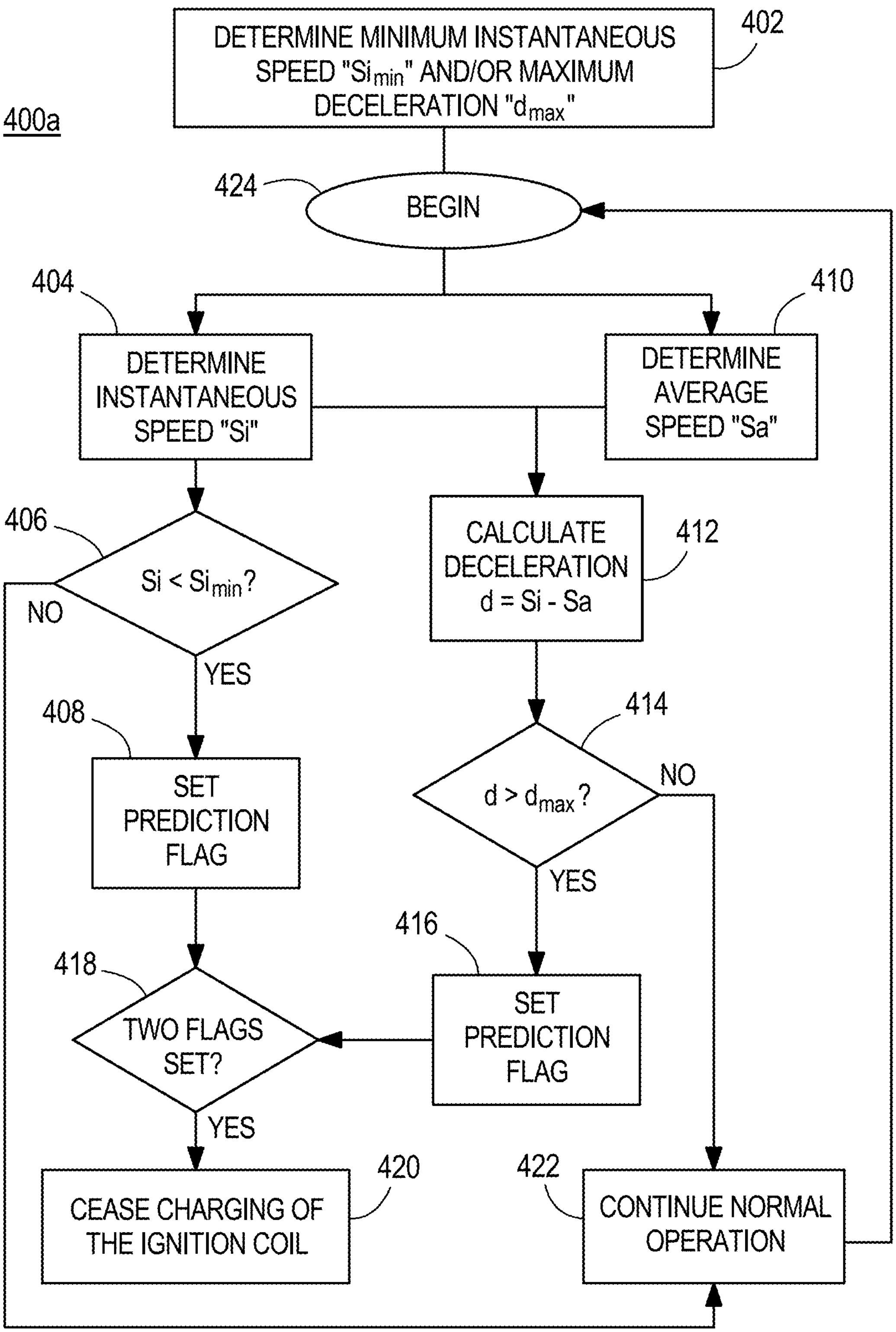
FIG. 4 illustrates an example reverse rotation event algorithm implemented by the control system of FIG. 1 or FIG. 2 according to an aspect of the disclosure herein.

FIG. 4 illustrates an example reverse rotation event algorithm **400*a*, e.g., the reverse rotation event algorithm 220, according to an aspect of the disclosure herein. Implementation of the reverse rotation event algorithm 400***a* may be performed by the prediction controller 106, the ECU 130, or a combination of the prediction controller 106 and the ECU 130. In some instances, the reverse rotation event algorithm 400*a* is continuously run during operation of the engine. In some instances, the reverse rotation event algorithm 400*a* occurs every time a tooth 110 is detected by the set of sensors 104.

The reverse rotation event algorithm 400*a* includes a step 402 of predetermining the maximum deceleration threshold $d_{max}$ and the minimum instantaneous speed threshold $Si_{min}$ associated with the crankshaft trigger wheel 102. The maximum deceleration threshold $d_{max}$ is based on a current engaged gear and required instantaneous speed ($Si_r$) of the crankshaft trigger wheel 102. For the maximum deceleration threshold $d_{max}$ each gear ($1^{st}$, $2^{nd}$, $3^{rd}$, etc.) may correspond to a different value for the required instantaneous speed ($Si_r$). The maximum deceleration threshold $d_{max}$ may be based on a TDC instantaneous speed ($Si_{TDC}$) of 0 RPM, in other words using equation 1 below, $d_{max}=Si_r$. Other values for $Si_{TDC}$ are also contemplated.

$$d_{max}=Si_r-Si_{TDC} \qquad \text{(Equation 1)}$$

The maximum deceleration threshold $d_{max}$ may be stored in, by way of example, the prediction memory 216 and associated with the type of crankshaft 108 and/or crankshaft trigger wheel 102.

The minimum instantaneous speed $S_{min}$ is based on a speed needed for the crankshaft trigger wheel 102 to move from the predetermined angular position θ to the TDC. For the minimum instantaneous speed $S_{min}$ each gear (1st, 2nd, 3rd, etc.) may correspond to a different value. In some examples the minimum instantaneous speed $S_{min}$ is equal to the required instantaneous speed ($Si_r$).

The minimum instantaneous speed $S_{min}$ may be stored in, by way of example, the prediction memory 216 and associated with the type of crankshaft 108 and/or crankshaft trigger wheel 102.

The reverse rotation event algorithm 400*a* includes a step 404 of deriving an instantaneous speed (Si) associated with the crankshaft trigger wheel 102. The step 404 may be carried out based on the crankshaft signal 302, e.g., the instantaneous speed signal 306.

At step 406, an instantaneous speed check occurs where a comparison of the instantaneous speed Si and the minimum instantaneous speed threshold $Si_{min}$ is conducted. When the instantaneous speed Si is less than the minimum instantaneous speed threshold $Si_{min}$, a first reverse rotation event flag 218*a* is set at step 408.

Concurrently, or sequentially to steps 402, 404, and 406, the reverse rotation event algorithm 400*a* includes a step 410 of determining an average speed Sa of the crankshaft trigger wheel 102 based on a number (n) of instantaneous speeds Si detected:

$$S_\alpha=Si/n \qquad \text{(Equation 1)}$$

At step 412, a deceleration value (d) is determined based on a difference between the instantaneous speed Si and the average speed Sa:

$$d=S_i-S_\alpha \qquad \text{(Equation 2)}$$

At step 414, a deceleration check occurs where the deceleration value d is compared to the maximum deceleration threshold $d_{max}$. When the deceleration value d is greater than the maximum deceleration threshold $d_{max}$, a second reverse rotation event flag 218*b* is set at step 416.

In one example, at step 418, a determination is made as to whether both reverse rotation event flags 218*a*, 218*b* have been set. In the event both have been set, at step 420, the ECU 130 sends a signal to cease an upcoming charging of the ignition coil to prevent combustion in the engine. Step 418 provides a check for each of steps 406 and 414.

In the event at least one reverse rotation event flag 218*a*, 218*b* is not set, at step 422 the engine 224 continues under normal operating conditions and the reverse rotation event algorithm 400*a* begins again at step 422. The reverse rotation event algorithm 400*a* is continuously running.

Figure 5:
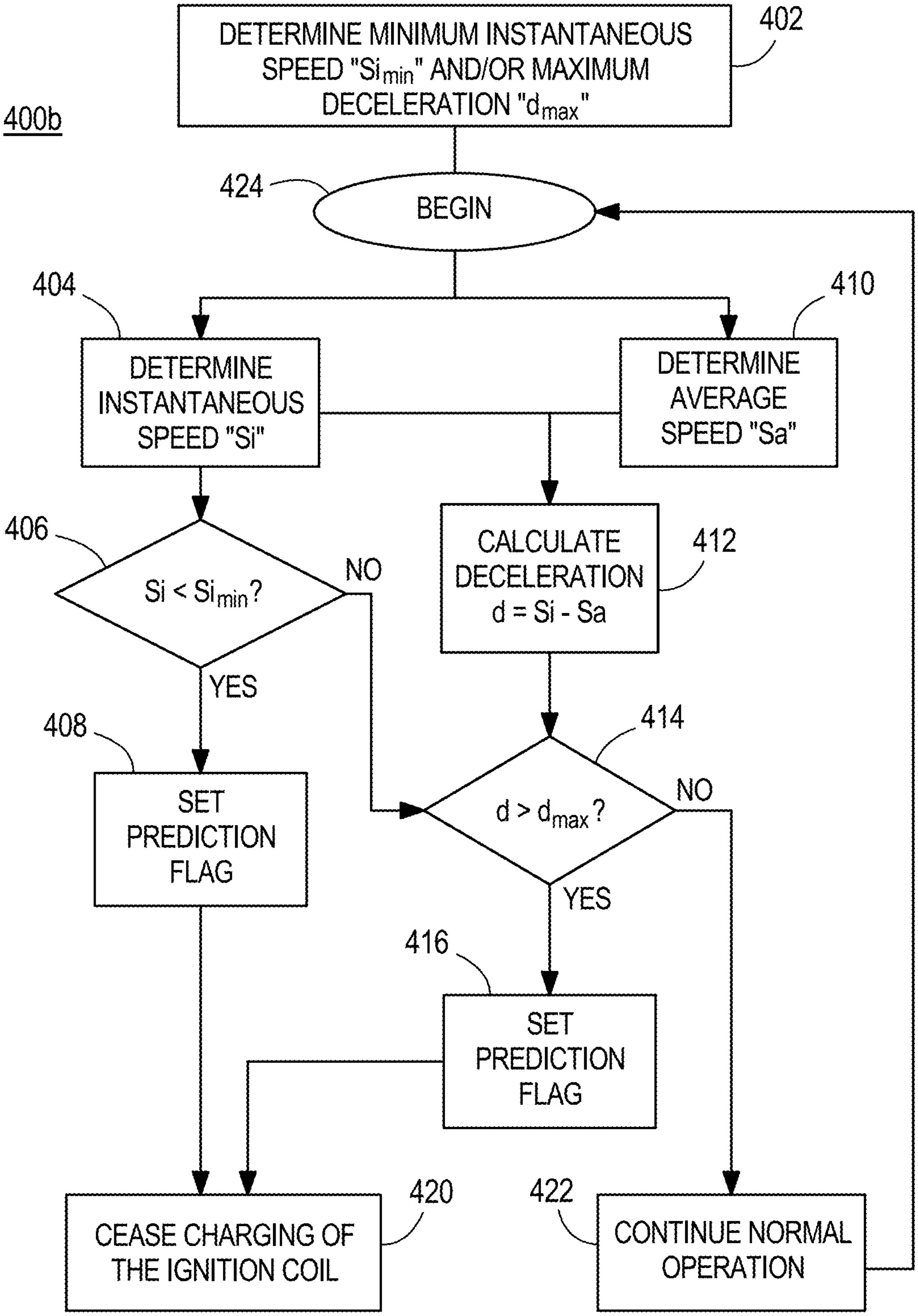
FIG. 5 illustrates an example reverse rotation event algorithm implemented by the control system of FIG. 1 or FIG. 2 according to another aspect of the disclosure herein.

FIG. 5 illustrates a variation of the reverse rotation event algorithm 400*a* of FIG. 4 referred to as variation algorithm 400*b*. To help ensure prevention of the reverse rotation event 308, in this variation when at least one reverse rotation event flag 218, 218*a*, 218*b* is set at either step 408 or step 416, the ECU 130 sends a signal to cease an upcoming charging of the ignition coil to prevent combustion in the engine. Further, both the instantaneous speed check at step 407 and the deceleration check at step 414 must pass in order for the engine 224 to continue under normal operating conditions.

Figure 6:
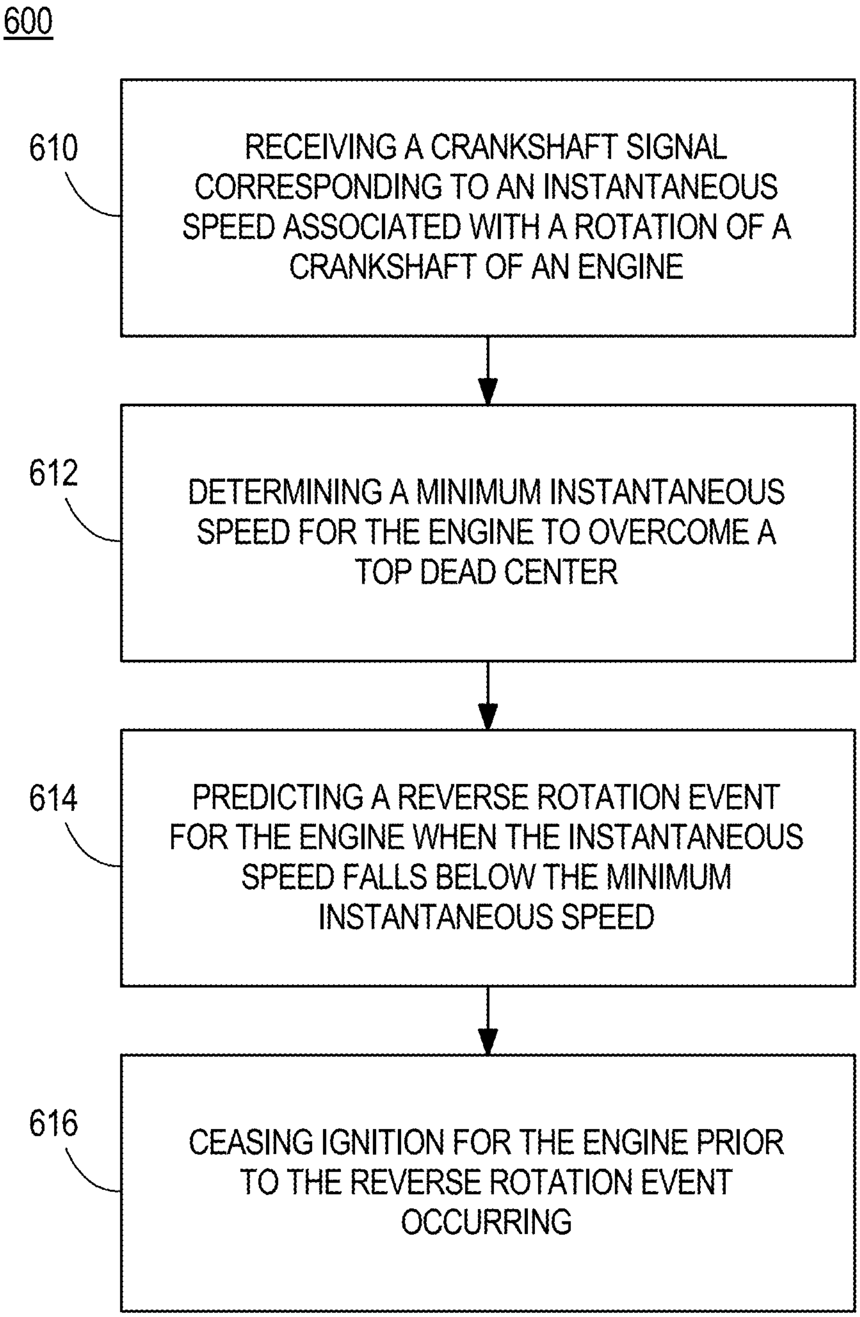
FIG. 6 is a flow diagram of an example method for operating an engine with the control system of FIG. 1 or FIG. 2.

FIG. 6 is a flow diagram of an example method 600 for operating the engine 224. The method 600 may be performed by the prediction controller 106 or performed by the prediction controller 106 and the ECU 130, by implementing the algorithm 220, 400*a*, 400*b* in at least one step of the method 600.

In the example shown, the method 600 includes, at block 610, receiving the crankshaft signal 302 corresponding to the instantaneous speed Si associated with a rotation of the crankshaft 108 of the engine. The crankshaft signal 302 may be associated with each individual tooth 110 of the crankshaft trigger wheel 102 mounted to the crankshaft 108.

In the example shown, the method 600 includes, at block 612, determining the minimum instantaneous speed $Si_{min}$ for the engine to overcome TDC.

In the example shown, the method 600 includes, at block 614, predicting the reverse rotation event 308 when the instantaneous speed Si falls below the minimum instantaneous speed $Si_{min}$.

In the example shown, the method 600 includes, at block 616, ceasing ignition for the engine prior to the reverse rotation event 308 occurring.

The method 600 may also include determining the average speed Sa of the crankshaft trigger wheel 102 based on the number n of crankshaft signals 308 received. The method may 600 include determining the deceleration value d as the crankshaft trigger wheel 102 approaches top dead center (TDC) by taking the difference between the instantaneous speed Si and the average speed Sa.

The method 600 may also include comparing the deceleration value d to the maximum deceleration value $d_{max}$ described herein. Predicting the reverse rotation event 308 may also include setting the first reverse rotation event flag 218*a* when the instantaneous speed falls below the minimum instantaneous speed and setting a second reverse rotation event flag 218*b* when the deceleration value exceeds the maximum deceleration value $d_{max}$. It is also contemplated that ceasing ignition for the engine occurs after both the first reverse rotation event flag 218*a* and the second reverse rotation event flag 218*b* have been set.

Accordingly, various implementations of the systems and methods described herein provide, among other things, techniques for detecting a clutch condition for a vehicle, in particular for a motorcycle. Other features and advantages of the disclosure are set forth in the following claims.

In the foregoing specification, specific examples have been described. However, one of ordinary skill in the art appreciates that various modifications and changes may be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims, unless the context explicitly indicates otherwise. The claimed subject matter is defined solely by the appended claims including any amendments made during the pendency of this application and all equivalents of those claims as issued.

In this document relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus.

An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way but may also be configured in ways that are not listed.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

It should also be noted that a plurality of hardware and software-based devices, as well as a plurality of different structural components may be utilized in various implementations. Aspects, features, and instances may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one instance, the electronic based aspects may be implemented in software (for example, stored on non-transitory computer-readable medium) executable by one or more processors. As a consequence, it should be noted that a plurality of hardware and software-based devices, as well as a plurality of different structural components may be utilized to implement various example, embodiments, aspects, and features. For example, "control system 100s" and "controllers" described in the specification can include one or more electronic processors, one or more memories including a non-transitory computer-readable medium, one or more input/output interfaces, and various connections (for example, a system bus) connecting the components.

It should also be understood that although certain drawings illustrate hardware and software located within particular devices, these depictions are for illustrative purposes only.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations collectively. To reiterate, those electronic processors and processing may be distributed.

What is claimed is:

1. A control system for an engine, the control system comprising:

a crankshaft trigger wheel coupled to a crankshaft;

a set of sensors equipped to generate a crankshaft signal associated with an instantaneous speed of the crankshaft trigger wheel; and a controller configured to:

receive the crankshaft signal corresponding to the instantaneous speed;

determine a minimum instantaneous speed for the crankshaft trigger wheel to overcome a top dead center (TDC);

predict a reverse rotation event for the engine when the instantaneous speed falls below the minimum instantaneous speed;

cease ignition for the engine prior to the reverse rotation event occurring;

determine an average speed of the crankshaft trigger wheel based on a number of crankshaft signals received;

determine a deceleration value as the crankshaft trigger wheel approaches top dead center (TDC) by taking a difference between the instantaneous speed and the average speed;

determine a maximum deceleration value;

compare the deceleration value to the maximum deceleration value; and predict the reverse rotation event when the deceleration value exceeds the maximum deceleration value.

2. The control system of claim 1, wherein the crankshaft trigger wheel comprises individual teeth and tooth spaces, and the crankshaft signal is associated with movement of each individual tooth of the crankshaft trigger wheel.

3. The control system of claim 1, wherein the controller comprises an electronic processor.

4. The control system of claim 3, wherein the controller comprises software executed by the electronic processor.

5. The control system of claim 1, wherein the controller is configured to set a first rotation event flag when the instantaneous speed falls below the minimum instantaneous speed and to set a second rotation event flag when the deceleration value exceeds the maximum deceleration value.

6. The control system of claim 5, wherein the controller is configured to cease ignition for the engine after both the first rotation event flag and the second rotation event flag have been set.

7. The control system of claim 1, wherein the set of sensors is located at a predetermined angular position.

8. The control system of claim 1, wherein the engine is a multi-cylinder engine.

9. A method for operating an engine, the method comprising:

receiving, at an electronic processor, a crankshaft signal corresponding to an instantaneous speed associated with a rotation of a crankshaft of the engine;

determining, via the electronic processor, a minimum instantaneous speed for the engine to overcome a top dead center (TDC);

predicting, via the electronic processor, a reverse rotation event for the engine when the instantaneous speed falls below the minimum instantaneous speed;

ceasing, via the electronic processor, ignition for the engine prior to the reverse rotation event occurring:

determining, via the electronic processor, an average speed of a crankshaft trigger wheel based on a number of crankshaft signals received;

determining, via the electronic processor, a deceleration value as the crankshaft trigger wheel approaches top dead center (TDC) by taking a difference between the instantaneous speed and the average speed;

determining, via the electronic processor, a maximum deceleration value and comparing the deceleration value to the maximum deceleration value; and predicting the reverse rotation event when the deceleration value exceeds the maximum deceleration value.

10. The method of claim 9, wherein the crankshaft signal is associated with each individual tooth of a crankshaft trigger wheel mounted to the crankshaft.

11. The method of claim 9, further comprising setting a first rotation event flag when the instantaneous speed falls below the minimum instantaneous speed and setting a second rotation event flag when the deceleration value exceeds the maximum deceleration value.

12. The method of claim 11, wherein ceasing ignition for the engine occurs after both the first rotation event flag and the second rotation event flag have been set.

13. The method of claim 9, further comprising sensing, with a set of sensors located at a predetermined angular position, the crankshaft signal.

14. The method of claim 9, further comprising setting a reverse rotation event flag when the instantaneous speed falls below the minimum instantaneous speed.

15. A method for operating an engine, the method comprising:

receiving, at an electronic processor, a crankshaft signal corresponding to an instantaneous speed associated with a rotation of a crankshaft of the engine;

determining, via the electronic processor, an average speed of a crankshaft trigger wheel based on a number of crankshaft signals received;

determining, via the electronic processor, a deceleration value as the crankshaft trigger wheel approaches top dead center (TDC) by taking a difference between the instantaneous speed and the average speed;

determining, via the electronic processor, a maximum deceleration value and comparing the deceleration value to the maximum deceleration value;

predicting a reverse rotation event when the deceleration value exceeds the maximum deceleration value; and ceasing, via the electronic processor, ignition for the engine prior to the reverse rotation event occurring.

16. The method of claim 15, further comprising setting a reverse rotation event flag when the deceleration value exceeds the maximum deceleration value.

17. The method of claim 16, further comprising determining, via the electronic processor, a minimum instantaneous speed for the engine to overcome a top dead center (TDC).

18. The method of claim 17, further comprising predicting, via the electronic processor, the reverse rotation event for the engine when the instantaneous speed falls below the minimum instantaneous speed.

19. The method of claim 18, further comprising setting an additional reverse rotation event flag when the instantaneous speed falls below the minimum instantaneous speed.

20. The method of claim 19, wherein ceasing ignition for the engine occurs after both the reverse rotation event flags have been set.

* * * * *